United States Patent

[11] 3,564,103

[72] Inventors Albert Brachschob
 Hurth near Cologne;
 Heinrich Weiler, Hermulheim near Cologne, Germany
[21] Appl. No. 853,098
[22] Filed Aug. 26, 1969
[45] Patented Feb. 16, 1971
[73] Assignee Knapsack Aktiengesellschaft, Knapsack bei Cologne, Germany
[32] Priority Sept. 28, 1968
[33] Germany
[31] P 17 83 075.0

[54] SHUTOFF DEVICE FOR HOLLOW ELECTRODES
 10 Claims, 3 Drawing Figs.
[52] U.S. Cl. .................................................... 13/33;
 138/93; 220/24.5; 251/356
[51] Int. Cl. .................................................... F27b 1/20,
 H05b 3/60
[50] Field of Search .................................................... 13/9, 18,
 33; 220/24.5; 138/93; 251/294, 356

[56] References Cited
UNITED STATES PATENTS
| | | | |
|---|---|---|---|
| 1,837,070 | 12/1931 | Roth............................ | 13/33 |
| 2,678,666 | 5/1954 | Theis et al. .................. | 220/24.5x |
| 3,471,626 | 10/1969 | DeWeese et al............. | 13/18X |

Primary Examiner—Bernard A Gilheany
Assistant Examiner—Roy N Envoll, Jr
Attorney—Connolly & Hutz ABSTRACT: Shutoff device for hollow electrodes supplying particulate feed material to and/or removing furnace gas from electrothermal reduction furnaces, arc melting furnaces, e.g., calcium carbide or similar furnaces. The inner shell of the hollow electrode has an inclined pipe socket secured to it, preferably welded thereto, which in turn has detachably secured to it a sleeve with an inflatable bag therein. The bag is displaceable by means of a thrust rod from inside the sleeve to a position inside the hollow electrode, and inflated therein using gas under pressure to effect shutoff of the hollow electrode.

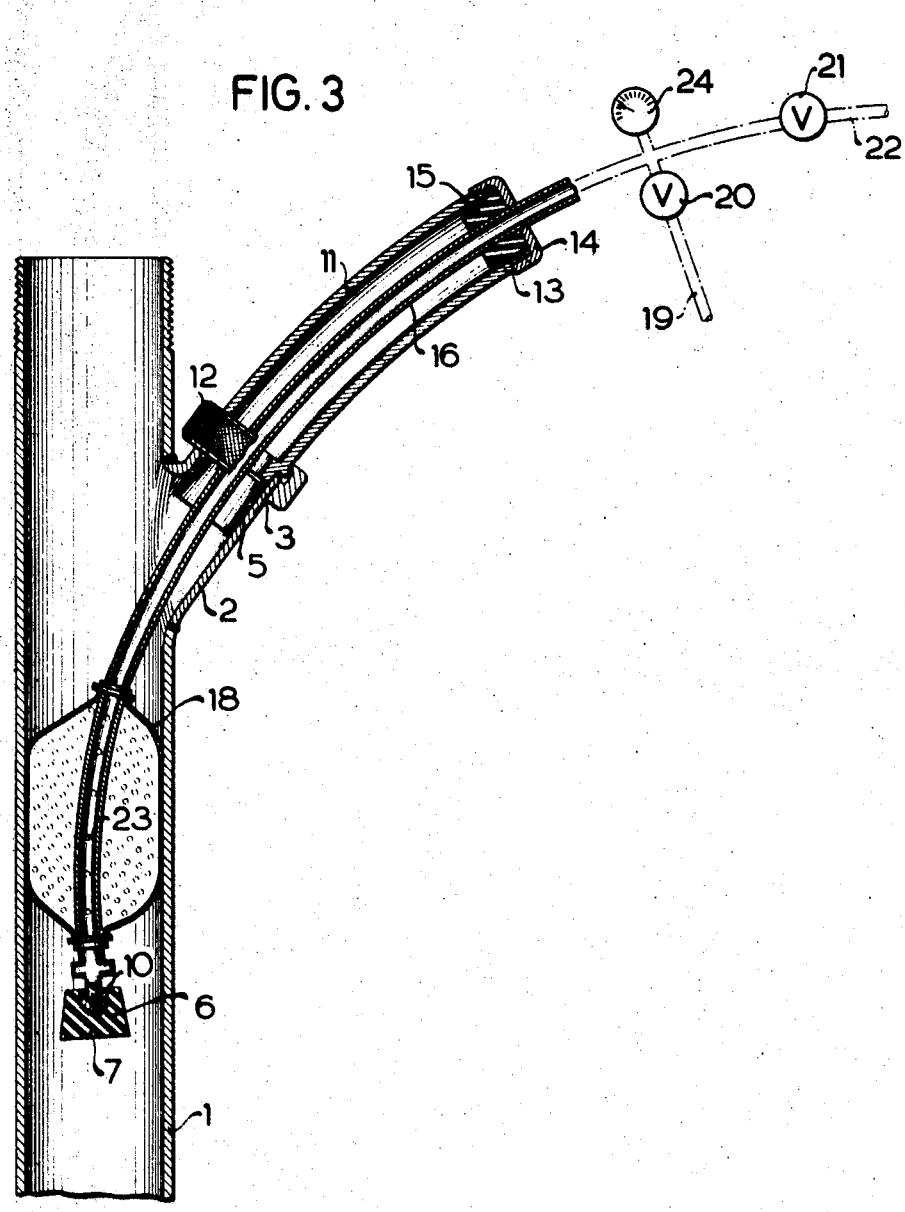

SHUTOFF DEVICE FOR HOLLOW ELECTRODES

The present invention relates to a shutoff device for hollow electrodes supplying particulate feed material to and/or removing furnace gas from electrothermal reduction furnaces, arc melting furnaces, for example calcium carbide or similar furnaces.

Hollow electrodes used for supplying feed material to and removing gas from a furnace, for example electrothermal calcium carbide furnaces, are known to offer considerable advantages. It is also known, however, that the use of hollow electrodes is accompanied by difficulties which are primarily occasioned by the high CO-gas pressure found to prevail inside closed calcium carbide furnaces, more particularly inside large furnaces. More particularly, the substitution of a fresh hollow electrode section for the electrode portion consumed in the furnace makes it necessary for the hollow electrode to be shut off by suitable means so as to avoid costly shutdown of the furnace which normally accompanies the substitution of a fresh electrode section. On substituting a new electrode section, which normally has a length of 1.5 meters, it is necessary for a new electrode shell segment to be welded to the outer electrode shell and for a further electrode shell segment to be welded to the inner electrode shell, and for the annular space left therebetween to be filled with electrode mass.

The feed material coming from a bunker, for example, can be supplied using a screw conveyor for a tube variable in length.

A conventional shutoff means of the type described above comprises a supply device mounted on the hollow electrode, delivering feed material to the furnace and/or removing furnace gas therefrom, through the hollow electrode. This device has a thrust rod slidably mounted therein, coaxially with respect to the electrode, and a plug or stopper variable in diameter is detachably secured to the thrust rod. The thrust rod, which can be actuated from the outside, enables the stopper to be moved inside the supply device from a position permitting the free supply and removal of material through the electrode to a position inside the electrode, where the supply and removal of material therethrough is arrested and inversely.

The shutoff device described hereinabove is, however, not fully satisfactory bearing in mind that it is necessary for the supply device and its supply line to be removed prior to the substitution of a new electrode section comprising an inner electrode shell segment and an outer electrode shell segment, and to be remounted thereafter.

To carry out this complicated work, it is also necessary for a fairly high space to be available above the electrode.

To return to electrode operation, it is necessary for the stopper to be lifted up by actuating the thrust rod which incidentally is not absolutely safe to handle in view of the interlinked tension between the electrodes and the star voltage between each electrode and the ground, in electric furnaces.

The object of the present invention is to provide a shutoff device for hollow electrodes which is free from the deficiencies reported above and designed so as to enable the feed material to be supplied to the furnace in continual and more particularly in undisturbed fashion, through the hollow electrode. This is substantially achieved by the apparatus of the present invention, wherein the inner shell of the hollow electrode has an inclined pipe socket secured to it, preferably welded thereto, which in turn has detachably secured to it a sleeve with an inflatable bag therein, which is displaceable be means of a thrust rod from inside the sleeve to a position inside the hollow electrode, and inflated therein using gas under pressure to effect shutoff of the hollow electrode. While it is advantageous for the bag to be made up of extensible material, which preferably is rubber, it is also possible for it to be made of inextensible material. The shutoff device so designed fully satisfies the requirements ser forth above and enables hollow electrodes supplying particulate feed material to and/or removing furnace gas from electrothermal reduction furnaces, arc melting furnaces, for example calcium carbide or similar furnaces, to be reliably shut off. More particularly, it enables the feed material to be conveyed in rectilinear fall from the upper end to the lower end of the hollow electrode, which is so desirable, Still further, it is possible for the hollow electrode to be shut off in simple and easy manner without the need to carry out complicated and hazardous work above the electrode, using lifting appliances.

In accordance with a further feature of the present invention, the inclined pipe socket has an external thread secured to its free end, and the front end of the sleeve carries a nut union to detachably secure the sleeve to the threaded pipe socket.

It is advantageous for the sleeve to have a radius of curvature such that the assumed extension of its center axis is substantially tangential to the center axis of the hollow electrode. For the rubber bag it is thereby possible to be placed as desired, in the hollow electrode.

In accordance with a further feature of he present invention, the inflatable bag is secured to and envelops the lower end of the thrust rod, which is a bent pipe whose center axis is arranged so as to coincide with that of the sleeve. This makes it unnecessary for the operating personnel to pay particular attention to the introduction of the rubber bag into the hollow electrode, in which it is perfectly guided.

The invention also provides for a sleeve with a conical inside to be disposed in the inclined pipe socket, the sleeve receiving a stopper which has a cap nut secured to it and can be maintained in position by means of a screw bearing against a disc supported by the sleeve. It is possible for the stopper to be an elastically deformable stopper, preferably a rubber stopper, and for the cap nut to be vulcanized into it.

An exemplary representation of the device of the present invention is shown diagrammatically in the accompanying drawings, wherein;

FIG. 3 shows the inner electrode shell with the sleeve screwed to the inclined pipe socket, in closed position.

Figure 1:
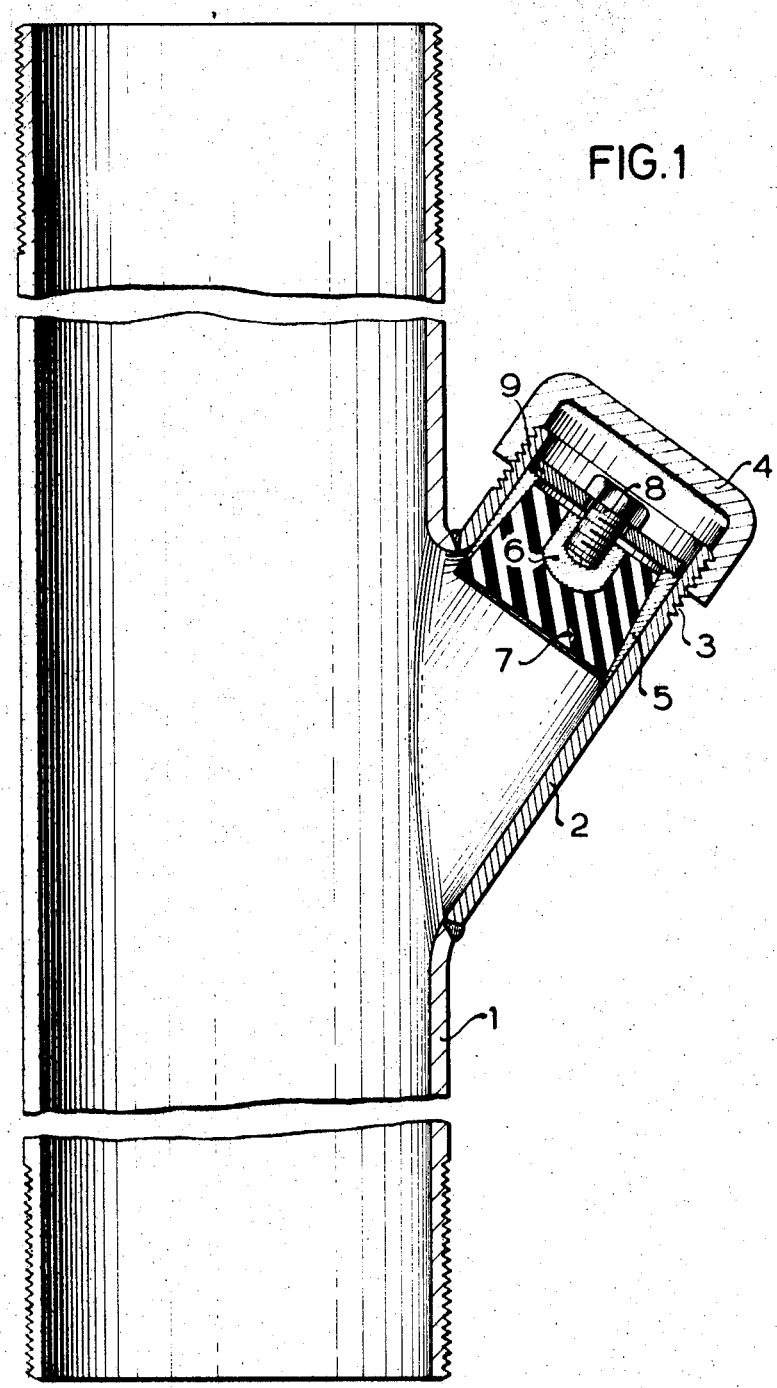
FIG. 1 is a side elevational view of the hollow electrode having the inclined pipe socket secured to it.

As can be seen, the shutoff device for hollow electrodes supplying particulate feed material to and/or removing furnace gas from electrothermal reduction furnaces, arc melting furnaces, e.g., calcium carbide or similar furnaces, shown diagrammatically in the accompanying drawing has an inclined pipe socket 2 welded to the inner shell 1 of the hollow electrode. The free end of pipe socket 2 has a thread 3 secured to it, receiving screw cap 4, when shutoff of the hollow electrode is unnecessary. Inclined pipe socket 2 also has a conical sleeve 5 adhered to it to clamp stopper 7 with cap nut 6. Stopper 7 is secured by means of screw 8 bearing against disc 9, to prevent it from falling into the hollow electrode.

For the substitution of a new electrode segment, it is necessary for cap 4, screw 8 and disc 9 to be removed from inclined pipe socket 2; thread bolt 10 is screwed into cap nut 6, and sleeve 11 is secured to inclined pipe socket 2, by means of nut union 12. The free end of sleeve 11 carries thread 13 and is closed by means of screw cap 14 and a further stopper 15.

Rubber bag 18, which is surrounded by a protective Perlon sheathing 17 fastened to the lower end of bent pipe 16, is placed in sleeve 11. The lower end of bent pipe 16 has a plurality of apertures 23 for inflating rubber bag 18 by supplying nitrogen through line 19 and valve 20, and for deflating it be means of valve 21 and line 22. The pressure prevailing inside rubber bag 18 is monitored using manometer 24.

FIG. 3 shows the shutoff device in closed position. The upper end of inner shell 1 of the hollow electrode is closed with respect to the furnace inside in the following manner: rubber bag 18 surrounded by the protective Perlon sheathing (not shown in the drawing) and rubber stopper 7 screwed to bent pipe 16 are introduced into the inner shell 1 of the hollow electrode by actuating bent pipe 16, and the rubber bag 18 is duly inflated by means of gas coming from a gas supply means. The bent pipe 16 serves simultaneously as the thrust rod. This effects close contact between rubber bag 18 and the inner shell 1 of the hollow electrode, which is hermetically closed.

Figure 2:
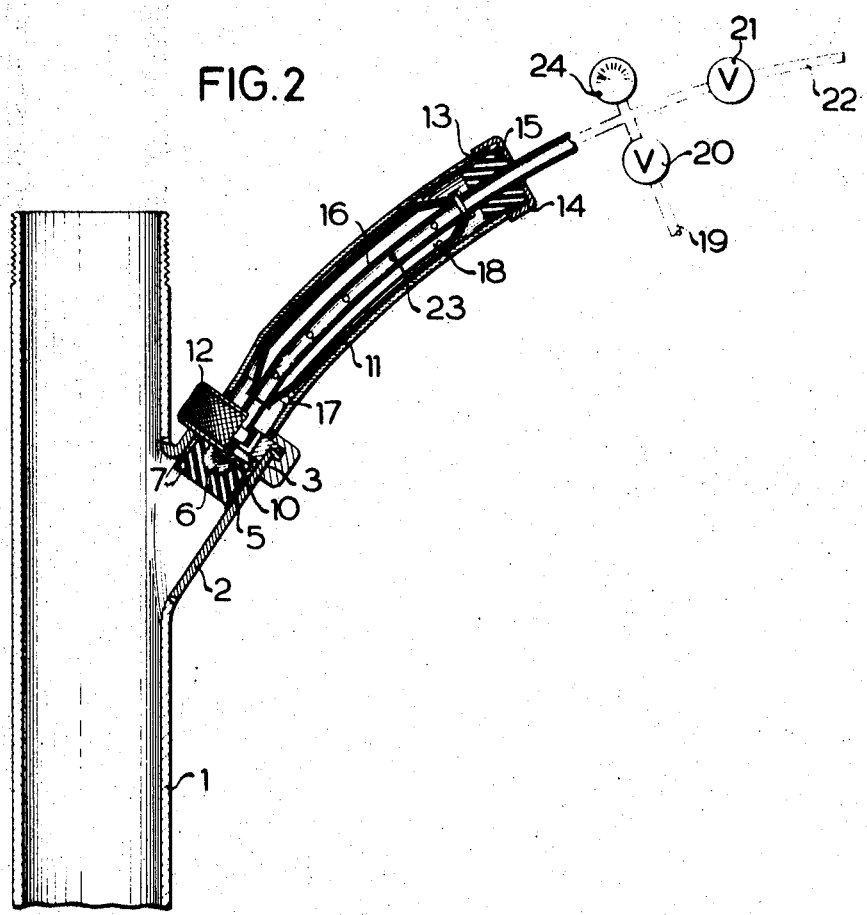
FIG. 2 shows the inner electrode shell with the sleeve screwed to the pipe socket, in open position.

After replacement of the electrode portion consumed by a new inner shell 1 prepared to have a pipe socket as shown shown in FIG. 1, rubber bag 18 is deflated and returned to sleeve 11, as shown in FIG. 2. Rubber stopper 7 now placed in conical sleeve 5 of inclined pipe socket 2 avoids the escape of CO-gas on loosening cap screw 12 and removing sleeve 11 with rubber bag 18 therein. This operation is terminated by screwing cap 4 onto inclined pipe socket 2, and the supply of feed material to the furnace through the hollow electrode can be resumed.

We claim:

1. A shutoff device for the inner shell of a hollow electrode supplying particulate feed material to and/or removing furnace gas from electrothermal reduction furnaces and arc melting furnaces, said shutoff device comprising an inclined pipe socket secured to said inner shell, a sleeve detachably secured to said pipe socket and having an inflatable bag therein, a thrust rod to position said inflatable bag from inside said sleeve to inside said inner shell, and means to inflate said bag with pressure gas inside said inner shell to effect shutoff of said inner shell.

2. The shutoff device as claimed in claim 11, wherein the inclined pipe socket is welded to the inner shell of the hollow electrode.

3. The shutoff device as claimed in claim 11, wherein the inflatable bag is made up of extensible material.

4. The shutoff device as claimed in claim 3, wherein the inflatable bag is a rubber bag.

5. The shutoff device as claimed in claim 1, wherein said inclined pipe socket has an external thread secured to its free end, and the front end of the sleeve carries a nut union to detachably secure said sleeve to said thread on said inclined pipe socket.

6. The shutoff device as claimed in claim 11, wherein the sleeve is designed to have a radius of curvature such that the assumed extension of its center axis is substantially tangential to the center axis of the hollow electrode.

7. The shutoff device as claimed in claim 11, wherein the inflatable bag is secured to and envelops the lower end of the thrust rod which is a bent pipe whose center axis is arranged so as to coincide with that of the sleeve.

8. The shutoff device as claimed in claim 11, wherein the inclined pipe socket has disposed in it a sleeve with a conical inside, receiving a stopper which has a cap nut secured to it and can be maintained in position by means of a screw bearing against a sleeve-supported disc.

9. The shutoff device as claimed in claim 11, wherein the stopper is an elastically deformable stopper and the cap nut is vulcanized into it.

10. The shutoff device as claimed in claim 9, wherein the stopper is a rubber stopper and the cap nut is vulcanized into it.